3 Sheets--Sheet 1.

J. G. STAUNTON.

Improvement in Bee-Hives.

No. 133,128.

Patented Nov. 19, 1872.

Witnesses.
C. H. Poole
J. B. Woodruff

Inventor,
J. Galusha Staunton

J. G. STAUNTON.

Improvement in Bee-Hives.

No. 133,128. Patented Nov. 19, 1872.

Witnesses,
C. H. Poole
J. B. Woodruff

Inventor,
J. Galusha Staunton

3 Sheets--Sheet 3.
J. G. STAUNTON.
Improvement in Bee-Hives.
No. 133,128. Patented Nov. 19, 1872.
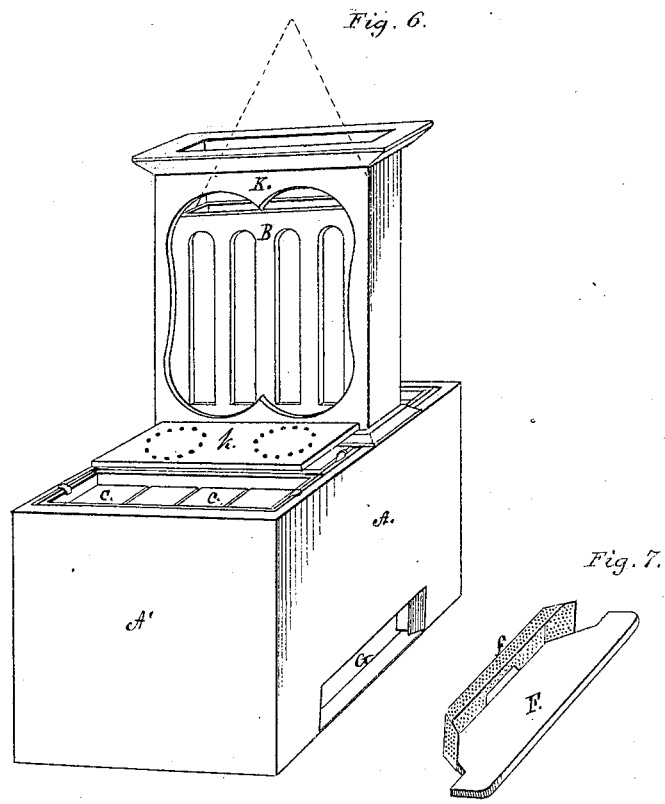
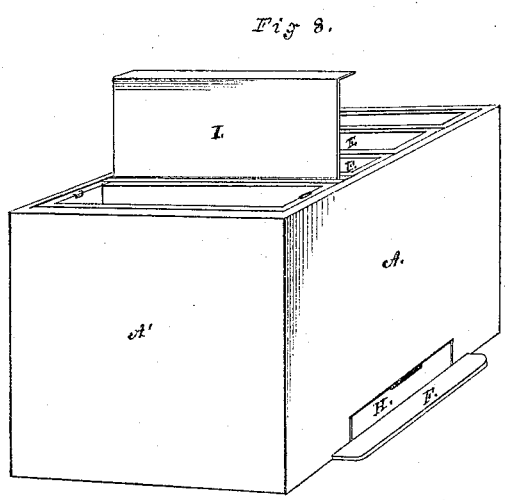
Witnesses.
C. H. Poole
J. B. Woodruff
Inventor,
J. Galusha Staunton

UNITED STATES PATENT OFFICE.

J. GALUSHA STAUNTON, OF ELLICOTTVILLE, NEW YORK.

IMPROVEMENT IN BEE-HIVES.

Specification forming part of Letters Patent No. 133,128, dated November 19, 1872; antedated November 16, 1872.

*To all whom it may concern:*

Be it known that I, J. GALUSHA STAUNTON, of Ellicottville, in the county of Cattaraugus and State of New York, have invented certain new and useful Improvements in Bee-Hives, and a transfer-case for dividing colonies of bees; and the following is a full, clear, and exact description of the same, reference being had to the accompanying drawing making a part of this specification, in which—

Figure 1:
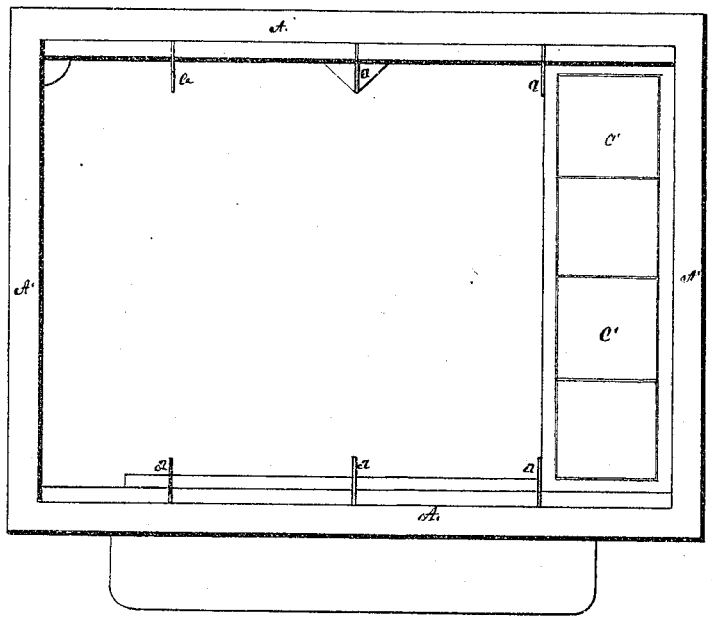
Figure 2:
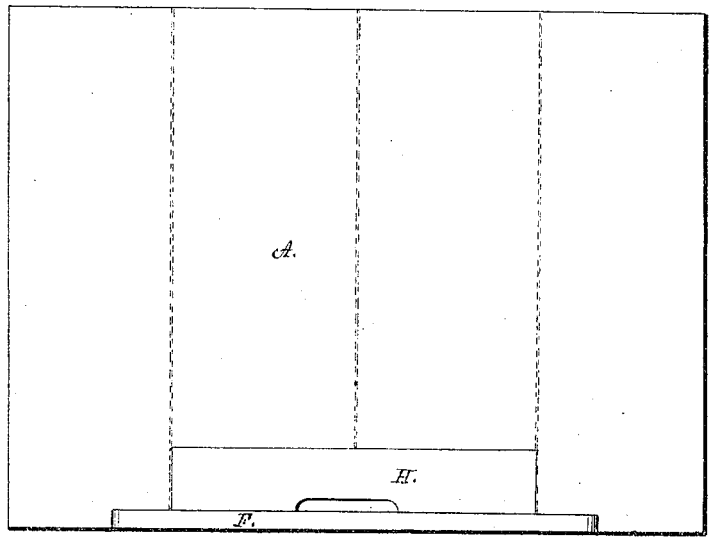
Figure 3:
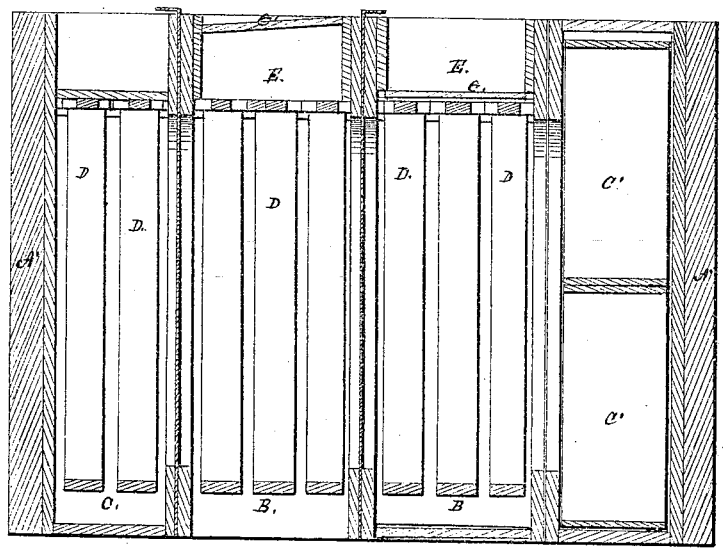
Figure 4:
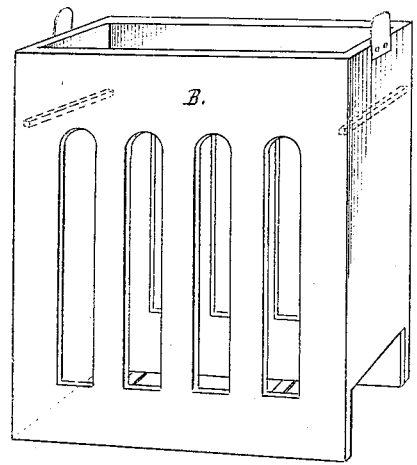
Figure 5:
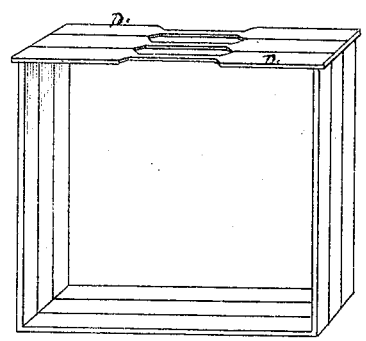

Plate 1—Figure 1 represents a plan or top view of the hive with the top removed, showing the interior guides, between the removable sections, with one end section in its place; Fig. 2 shows a front view of the body of the hive with the fly-board entrance and reversible stop. Plate 2—Fig. 3 represents a vertical and longitudinal section through the center of the hive; Fig. 4 shows a perspective view of one of the arcade comb-frame clasps; Fig. 5 shows a group of the comb-frames detached from the clasp. Plate 3—Fig. 6 is a perspective view of the hive, also the transfer-case in position, showing one of the sections or comb-frame clasps drawn up into it; Fig. 7 shows the curtain fly-board detached; and Fig. 8 is a perspective of the hive, showing the edge of the fly-board and reversible stop, also one of the tin-plate cut-offs, partly introduced between the sections of clasps.

The object of my invention is to facilitate the formation of new colonies; to prevent the increase of colonies, when desirable; to obviate the necessity of hiving swarms; and to enable the bee-keeper to perform the necessary operations in his business without exposure to the bees, and to dispense with the necessity of fumigating or sprinkling them during such operation. My invention consists in grouping together two or more comb-frames by the use of a comb-frame clasp, both sides of which clasps are open in arcades, and two of which groups, placed together equidistant from each end of the hive, constitute the brood-chamber proper. The remaining space at each end of the hive is filled by a movable case or recess for surplus honey, which case or recess opens in an arcade on one side corresponding with and next to the brood-comb section; the other side of the case or recess and the bottom are closed. The end cases may be supplied with comb-frames or boxes, as may be desired, and, when reversed, confine the hive to the brood-sections alone. My invention further consists in arranging on the inside wall of the hive, front and rear, and running vertically from top to bottom, three thin strips or guides, one between and one on each side of the two central comb-frame clasps or sections. These strips serve to hold the sections in place, and to guide the cut-offs, hereinafter described, when used. The strips or guides may be made of tin plate, one and a half inch wide, the length equal to height of hive, one of the longitudinal edges turned up to a right angle; and are secured in their places on the inside front and rear of hive by fastening thin strips of board, corresponding in dimensions with the ends of the comb-frame clasps or sections. These strips, resting on the flanges of the tin guides when secured, hold them in place, and constitute an additional thickness or lining to the front and rear of the hive. And, furthermore, my invention consists in cutting away a space in the front wall of the hive, next the bottom board, equal on the inner surface of the hive to the full width of both brood-sections, and flaring outwardly to the right and left, the height of the space so made being equal to one-tenth of the height of the hive, more or less. The tin guides above mentioned are cut off at the top of the space or porch, and that portion of the comb-frame clasps is also cut away next to and corresponding with the height and breadth of the porch, exposing the lower part of the comb-frames. The portion of the hive so cut out has a suitable fly-hole or entrance cut in its lower edge, and is fitted to and serves as a stop to the porch or space so cut away. The fly-board is a thin piece of board cut in shape to project a little in front of the hive, and to fit into the porch the full thickness of the front wall of the hive. To the inner edge of this fly-board, turning a little around the ends and backward at the top, is nailed a strip of perforated tin plate, as wide as is necessary to completely close the porch. Through this tin plate is cut a fly-hole corresponding with the fly-hole in the wooden stop. It further consists in sinking or placing the tops of the comb-frames, say two inches below the top of the comb-frame clasp, and closing the space so left above the tops of the comb-frames with a frame or box equal in dimensions to the inner area of the clasp or section, and supplying said box or frame with a floor of glass, which glass floor is near to the top of the comb-frames, and in arranging the top of this box or frame so that, when the comb-making season is over, by transferring the glass floor to the top of the frame for a roof an open space remains on top of the comb-frames, which communicates through their tops with the brood-comb below, and serves as a feeding-chamber. My invention further consists in an auxiliary box or transfer-case, corresponding in its inner area with the outside dimensions of that portion of the hive—either comb-frame clasp or section, or surplus-honey case—to be removed, and sufficiently exceeding it in height to admit of a perforated sliding bottom, with which it is supplied, being closed when the section is withdrawn from the hive into the transfer-case. The transfer-case is also provided with glass sides, and the molding at the top or end opposite to the sliding bottom has an inner projection sufficient to prevent the section of the hive from being drawn through it. Across the bottom of the brood-comb clasps are fastened two thin strips, which may be of tin plate, one near the front and the other near the rear of the hive, on which, during the season of the formation of new colonies, or whenever the sections or clasps are to be withdrawn, a false bottom is placed, it being introduced through the porch when the curtain fly-board is removed.

It will be observed that when the hive and all its parts are together and in place its entire interior, only for the intervention of the arcade-columns, is a unit.

To prevent the different sections dropping through when the hive is lifted from the bottom board tin-plate ledges are secured on the under edge of the hive, projecting inward, on which the sections are supported. The fly-board also is kept in place when the hive is raised by similar means.

*A General Description Referring to the Several Figures in the Drawing and the Letters marked thereon.*

A A are the two sides, front and back, of the hive; A' A', the two ends of the hive. B B are the comb-frame clasps or brood-sections. C C are the end cases or recesses for surplus honey. D D are the series of comb-frames. C' C' are honey-boxes, which may be used instead of the comb-frames D D in the end sections, if desired. *a a* are the vertical strips or guides for holding the sections. E E are the feeding-rooms. *e e'* are the glass floor in one section and the roof in the other. F is the curtain fly-board; and *f* is the curtain or perforated tin plate. G is the porch to receive the curtain fly-board and also the stop H. I is one of the tin-plate cut-offs partly inserted between the sections, as shown in Fig. 8. K is an auxiliary box or transfer-case; and *k* is the sliding bottom in position to slide under the comb-frame clasp B to close the bottom as placed in position for the withdrawal of a section for examination or a removal, as shown in Fig. 6.

In operating the hive, to introduce a natural swarm to a hive of this kind the stop H and curtain fly-board F may both be removed. The stop H may be laid aside in hot weather; should be kept in place during spring and fall, and inverted during the winter. To form two colonies from one, at some hour of the day when the bees are all in—morning or evening—the stop H should be inverted to shut them in; the outside movable flanged cover then removed from the top of the hive; a tin cut-off, I, corresponding in size with the section, is introduced on each side of the section to be withdrawn and behind the guides *a a*. The transfer-case K is adjusted above the section to be withdrawn, which section is gently lifted into the transfer-case and the sliding bottom *k* closed. The transfer-case and its contents are then removed and the section lowered into another hive. An empty section is then introduced into the space from which the full section was removed; the cut-offs I I are withdrawn, the covers replaced, and fly-holes adjusted, and the operation is complete.

Sections containing old comb, or the cases containing surplus honey, may be removed to a distance and the bees allowed to return to the hive; and bees may be transferred from hive to hive, and from old sections to new, by the same method, and without violence or exposure to their stings.

What I claim as my invention is—

1. The combination of the fly-board F with its perforated curtain *f*, the porch G, and reversible stop H, substantially as shown and described.

2. The combination of the arcade comb-frames B B, the feed-chambers E E with their reversible glass floor and roof *e e'*, and the vertical guide-strips *a a* for holding the cut-off plate I in position to confine the bees to their section when other sections are removed, as herein specified.

3. The auxiliary box or transfer-case K, when constructed with a sliding bottom, *k*, and applied to the hive in such a manner as to remove any one of the sections of brood-comb or honey-boxes without liberating the bees from either the hive or the transfer-case, as herein set forth.

J. GALUSHA STAUNTON.

Witnesses:
 JNO. D. PATTEN,
 ALONZO HUGHES.